Sept. 5, 1967 E. WILLEMS ETAL 3,340,404

CIRCUIT ARRANGEMENT FOR SUPPLYING A VOLTAGE TO A LOAD

Filed April 22, 1964

INVENTOR.
EBERTUS WILLEMS
MARTINUS H.W. LEENAERTS
BY Frank R. Trifari
AGENT 3,340,404
Patented Sept. 5, 1967

3,340,404

CIRCUIT ARRANGEMENT FOR SUPPLYING A VOLTAGE TO A LOAD

Ebertus Willems and Martinus Henricus Wilhelmus Leenaerts, Emmasingel, Eindhoven, Netherlands, assignors to North American Philips Company, Inc., New York, N.Y., a corporation of Delaware Filed Apr. 22, 1964, Ser. No. 361,672
Claims priority, application Netherlands, Apr. 23, 1963, 291,871
11 Claims. (Cl. 307—88.5)

ABSTRACT OF THE DISCLOSURE

An electrical circuit arrangement particularly suitable for supplying a load circuit remotely located with respect to the energizing source comprising two transistors connected in series each in one of the supply lines. The transistors, of opposite conductivity type, have their collectors connected to opposite terminals of the supply source and their emitters to the load. A stabilized potential which may be derived from the source, is connected with opposite polarities to the bases of the transistors.

The invention relates to a circuit arrangement for supplying a voltage to a load. It deals in particular with the problem that the load, for example an amplifier, must be fed from a voltage source which is available, in which, however, it must be possible to freely choose the connections to earth of the supply voltage source and of the load. It may occur, for example, that a pre-amplifier and an output amplifier are to be supplied from the same supply source, the said amplifiers being connected together by a long cable. If these amplifiers have no direct current separation, as is normal in transistor amplifiers, undesired signal currents may arise through the supply source and its connection leads to the amplifiers, which give rise to undesired couplings. This problem could be avoided, of course, by using one supply source and to effect the supply of the one amplifier through the said cable, but this has the drawback in general, that too much supply energy is lost, while the cable also is not always suitable to handle this supply current. Also in the case in which the amplifiers do have a direct current separation, similar problems may arise all the same.

It is the object of the invention to provide a simple solution to this problem. The invention is characterized in that the load is connected between the emitters of two transistors of opposite conductivity types, to the collectors of which supply voltage is set up and the bases of which are connected to each other through a circuit across which a smaller voltage difference arises than the value of the supply voltage.

In order that the invention may readily be carried into effect, several embodiments thereof will now be described more fully, by way of example with reference to the accompanying drawing, in which FIG. 1 shows a circuit diagram according to the invention.

Figure 1:
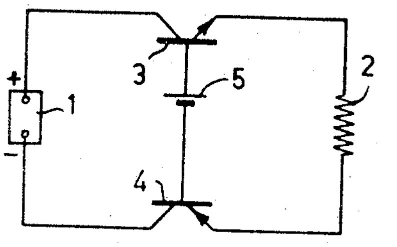

The circuit arrangement shown in FIG. 1 comprises a supply source 1 and a load 2. For supplying voltage from the source 1 to the load 2, according to the invention two transistors 3 and 4 respectively are provided, the source 1 being connected between the two collectors of these transistors, the load 2 being connected between the two emitters, and an auxiliary source 5 being connected between the two bases of these transistors. The transistors 3 and 4 are of opposite conductivity types, namely transistor 3 is of the npn-conductivity type and transistor 4 is of the pnp-conductivity type. The source 5 supplies a voltage which is smaller than that of the source 1 and is polarized so that it renders the emitter-base path of the transistors 3 and 4 conductive. Consequently, a voltage will be produced across the load 2 which is approximately equal to that of the source 5. The current through the load 2, however, is substantially supplied by the source 1, because the transistors 3 and 4 which are rendered conductive by the source 5 pass current from their collectors to their emitters and, consequently, the source 5 need supply only the base-current of the transistors which is equal to $(1-\alpha)x$ the current through the load, $\alpha$ being the emitter-collector current amplification factor of the transistor.

If the source 1 and the load 2 are connected to different points to earth, that is to say that one terminal, for example the lower side of the load 2, conveys alternating voltage with respect to that of the source 1, a corresponding voltage difference will be produced between the emitter and the collector of the associated transistor 4, the base-electrode of the transistor 4 adjusting automatically to a value which is substantially equal to its emitter-voltage. Because the voltage of the source 5 is smaller than the supply voltage of the source 1, the correct bias voltage will continue prevailing at the collector of the transistor 3 and/or the transistor 4, subject to the alternating voltage between the emiter and the collector of the transistor 4 being not too large, so that at least one of these transistors remains operative as an amplifier and consequently passes a small base current as compared with the emitter-collector current. In this manner undesired couplings are avoided between various amplifiers to be connected to the supply source 1 as a result of the alternating currents through the supply source 1.

It will be clear that variations of the source 5 will produce corresponding voltage variations across the load 2. Condition is that the total voltage between the two bases of the transistors 3 and 4 does not change sign and, on the other hand, does not assume a value larger than the voltage of the source 1.

Figure 2:
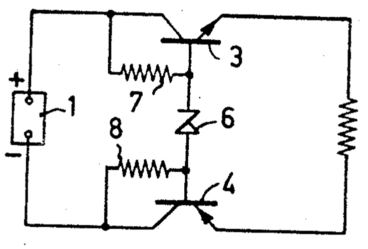
FIG. 2 shows an embodiment having a favourable operation.

In the embodiment shown in FIG. 2, the source 5 is replaced by a Zener diode 6. The Zener voltage of this diode 6 must be smaller than the voltage of the source 1. A breakdown of the Zener diode 6 is effected by means of the resistors 7 and 8 which connect the Zener diode 6 to the supply source 1, so that an approximately constant voltage is obtained between the two base electrodes of the transistors 3 and 4 with an operation analogous to that of the voltage source 5 in FIG. 1.

Figure 3:
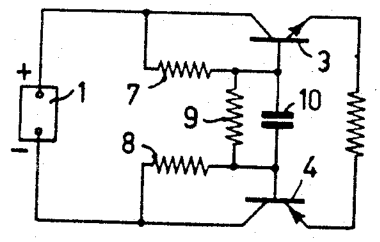
FIG. 3 shows a variation of FIG. 2.

In FIG. 3 a potentiometer is connected in a corresponding manner in parallel with the source 1, which potentiometer comprises the high-ohmic resistors 7 and 8 between this source and the base electrodes of the transistors 3 and 4, and a resistor 9 with a decoupling capacitor 10 connected between these two base electrodes respectively. Again in a similar manner a voltage smaller than the supply voltage of the source 1 is set up across the resistor 9, so that again a corresponding operation of FIG. 1 is obtained.

Figure 4:
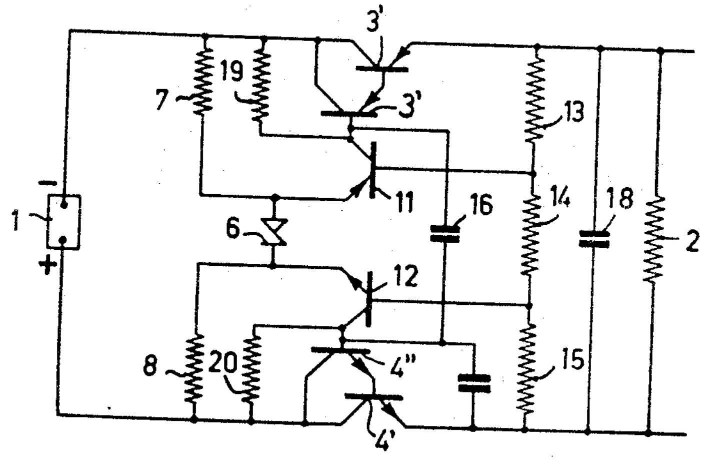
FIG. 4 shows a further elaboration of the circuit arrangement shown in FIG. 2.

In FIG. 4 the Zener diode 6 is again caused to breakdown by the connection through the resistors 7 and 8 to the voltage source 1. Instead of the transistors 3 and 4, transistor combinations 3′—3″ and 4′—4″ are used, the base current of the transistors 3″ and 4″ repectively being only $(1-\alpha)^2x$ the collector current of the transistors 3′ and 4′ respectively. By using further amplifier transistors 11 and 12 of corresponding conductivity types, the bases of which are connected to a potentiometer 13, 14, 15 parallel to the load 2, a better stabilization of the voltage across the load 2 is obtained in the case of a small current through the Zener diode 6.

In a practical embodiment of this circuit arrangement the following circuit elements were used:

Transistors:

| | |
|---|---|
| **3'** | ASZ17 |
| **3''** | OC75 |
| **4'** | AC130 |
| **4''** | OC141 |
| **11** | OC75 |
| **12** | OC141 |

Zener diodes:

| | |
|---|---|
| **6** | OAZ206 |

Resistors:

| | kΩ |
|---|---|
| **7** | 3 |
| **8** | 2.2 |
| **13** | 10 |
| **14** | 16 |
| **15** | 10 |
| **19** | 12 |
| **20** | 12 |

Capacitors:

| | μf |
|---|---|
| **16** | 100 |
| **17** | 400 |
| **18** | 250 |

The voltage for the source 1=24 v., the voltage across the load 2=20 v., load current 200 ma.

What is claimed is:

1. A circuit arrangement for supplying a voltage to a load, characterized in that the load is connected between the emitters of two transistors of opposite conductivity types, at the collectors of which a supply voltage is set up and the bases of which are connected to each other through a circuit across which a smaller voltage difference arises than the value of the supply voltage.

2. A circuit arrangement as claimed in claim 1, characterized in that the said circuit comprises a Zener diode between the bases of the transistors.

3. A circuit arrangement as claimed in claim 1, characterized in that the circuit comprises a decoupling capacitor between the two base electrodes.

4. A circuit arrangement as claimed in claim 1, characterized in that the said bases are connected to further amplifier transistors each of a conductivity type corresponding to that of the associated transistor, the bases of which are connected to a potentiometer in parallel with the load.

5. A circuit arrangement for coupling a supply voltage to a load, comprising: a source of voltage supply having a given nominal value, a load, two transistor devices of opposite conductivity types, each transistor device including emitter, base, and collector electrodes, circuit means for coupling said load across the emitter electrodes of the transistor devices, circuit means for coupling said source across the collector electrodes of the transistor devices, and auxiliary means coupled to both base electrodes of the transistor devices for setting up an auxiliary voltage at said bases, said auxiliary voltage having a nominal value less than the given nominal value of said source of voltage supply.

6. A circuit arrangement for coupling a supply voltage to a load, comprising: a source of voltage supply having a given nominal value, a load, two transistor devices of opposite conductivity types, each transistor device including emitter, base, and collector electrodes, circuit means for coupling said load across the emitter electrodes of the transistor devices, circuit means for coupling said source across the collector electrodes of the transistor devices, and auxiliary source means coupled to both base electrodes of the transistor devices for setting up an auxiliary voltage at said bases, said auxiliary means having a polarity operative to render conductive the emitter-base path of each transistor device, said auxiliary voltage having a nominal value less than the given nominal value of said source of voltage supply.

7. A circuit arrangement for coupling a supply voltage to a load, comprising: a source of voltage supply having a given nominal value, a load, two transistor devices of opposite conductivity types, each transistor device including emitter, base, and collector electrodes, circuit means for coupling said load across the emitter electrodes of the transistor devices, circuit means for coupling said source across the collector electrodes of the transistor devices, a Zener diode coupled to both base electrodes of the transistor devices and to the terminals of said source for setting up an auxiliary voltage at said bases, said Zener diode having a breakdown voltage which has a nominal value less than the given nominal value of said source of voltage supply.

8. A circuit arrangement as set forth in claim 7, wherein the Zener diode is coupled to the source by means of resistors.

9. A circuit arrangement for coupling a supply voltage to a load, comprising: a source of voltage supply having a given nominal value and two terminals, a load, two transistor devices of opposite conductivity types, each transistor device including emitter, base, and collector electrodes, circuit means for coupling said load across the emitter electrodes of the transistor devices, circuit means for coupling said source across the collector electrodes of the transistor devices, a capacitor coupled to both base electrodes of the transistor devices, direct current connections to said capacitor from said source for setting up an auxiliary voltage at said bases, a resistor connected across said capacitor, said auxiliary voltage having a nominal value less than the given nominal value of said source of voltage supply.

10. A circuit arrangement for coupling a supply voltage to a load, comprising: a source of voltage supply having two terminals and a given nominal value, a load, two transistor devices of opposite conductivity types, each transistor device including a pair of transistors of the same conductivity type having their base, emitter and collector electrodes coupled together to form combined base, emitter and collector electrodes, circuit means for coupling said load across the combined emitter electrodes of the transistor devices, circuit means for coupling said source across the combined collector electrodes of the transistor devices, and a Zener diode coupled to both combined base electrodes of the transistor devices and said two terminals for setting up an auxiliary voltage at said combined bases, said Zener diode having a breakdown voltage which has a nominal value less than the given nominal value of said source of voltage supply.

11. A circuit arrangement as recited in claim 10, wherein each end of the Zener diode is coupled to a combined base electrode through the emitter-collector paths of an amplifier transistor of the same conductivity type of the associated transistor device, the emitter and collector electrodes of the amplifier transistors being resistively coupled to respective terminals of said source, the base electrodes of the amplifier transistors being coupled to the load terminals.

References Cited

UNITED STATES PATENTS 3,284,641 11/1966 St. John. ---------- 307—88.5

ARTHUR GAUSS, *Primary Examiner.*

R. H. EPSTEIN, *Assistant Examiner.*